(12) United States Patent
Maloy et al.

(10) Patent No.: US 8,713,198 B2
(45) Date of Patent: Apr. 29, 2014

(54) HIERARCHICAL BINDING AND LOOKUP OF ADDRESSES IN INTER-PROCESS COMMUNICATIONS SYSTEMS

(75) Inventors: Jon Maloy, Montreal (CA); Per Andersson, Montreal (CA); Jonathan Lynam, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 223 days.

(21) Appl. No.: 13/152,995

(22) Filed: Jun. 3, 2011

(65) Prior Publication Data
US 2012/0311118 A1 Dec. 6, 2012

(51) Int. Cl.
*G06F 13/00* (2006.01)
(52) U.S. Cl.
CPC ...................................... *G06F 13/00* (2013.01)
USPC ............ 709/245; 709/223; 709/226; 709/203
(58) Field of Classification Search
USPC .................................. 709/245, 223, 226, 203
See application file for complete search history.

(56) References Cited

U.S. PATENT DOCUMENTS

| | | | |
|---|---|---|---|
| 5,386,413 A | 1/1995 | McAuley et al. | |
| 7,483,930 B1 | 1/2009 | Wright et al. | |
| 8,135,688 B2 * | 3/2012 | Shankar et al. | 707/696 |
| 2008/0313209 A1 * | 12/2008 | Shankar et al. | 707/102 |
| 2009/0010250 A1 | 1/2009 | Ganesan et al. | |
| 2009/0178104 A1 | 7/2009 | Shah et al. | |
| 2010/0195654 A1 | 8/2010 | Jacobson et al. | |
| 2011/0089229 A1 | 4/2011 | Shenfield et al. | |

FOREIGN PATENT DOCUMENTS

| | | |
|---|---|---|
| WO | WO 00/62158 | 10/2000 |
| WO | WO 2005/057427 A1 | 6/2005 |

OTHER PUBLICATIONS

"Linux TIPC 1.7 Programmer's Guide," Apr. 2010; Retrieved from the Internet: 32 pages.
Extended European Search Report, EP 12003990.4, Aug. 19, 2013, 6 pages.

* cited by examiner

*Primary Examiner* — Kenneth Coulter
(74) *Attorney, Agent, or Firm* — Myers Bigel Sibley & Sajovec, P.A.

(57) ABSTRACT

Systems/methods of looking up an address of a target server include receiving a first lookup request at a first lookup server that manages a first database that contains data relating to a first plurality of servers. First metadata relating to the target server is retrieved from the first database, and a second lookup request including the first metadata is sent to a second lookup server that manages a second database that contains data relating to a second plurality of servers. The second plurality of servers is a subset of the first plurality of servers and includes the target server. Second metadata relating to the target server is retrieved from the second database, and a response based on the first and second metadata is transmitted to the client. Corresponding systems/methods of binding a server address to a lookup key are also disclosed.

25 Claims, 15 Drawing Sheets

HIERARCHICAL BINDING AND LOOKUP OF ADDRESSES IN INTER-PROCESS COMMUNICATIONS SYSTEMS

TECHNICAL FIELD

The present invention relates to process based computing models, and more particularly to computer programs that use inter process communication mechanisms.

BACKGROUND

Many software applications are physically or logically split into separate components, or services, which communicate with each other via an inter-process communication (IPC) mechanism. For example, some components/services of a software application may act as server components that provide defined services to other software components. Software components that utilize the services of other software components may be referred to as client components.

In an IPC service, it is useful for one component to be able to send a message to another component without knowing its physical location. That is, the sending component should be able to reach a destination component using an address that is not tied to a specific physical location. In this manner, the sending component does not have to keep track of an address that may change when the destination component is moved. This feature becomes increasingly important in the currently evolving cloud based infrastructures.

It is also useful if a sending component can rely on a constant semantic meaning of an access key that can be used to reach a particular type of service. For example, it is useful for a sending component to be aware that "a destination that is reachable with key X always provides service Y". This way, the key can safely be hard-coded into the sending component without risking that it will ever become obsolete. This type of key is referred to herein as a destination name, or simply a name.

When a constant semantic access key is used, a lookup step must be performed in the IPC system to obtain a physical address corresponding to the destination name. In the lookup process, a destination name is translated to a location-specific address that may be used during the subsequent message transmission. The lookup process can be done in a number of ways.

For example, a lookup can be performed in the data transmission phase each time a message is sent. In this approach, a lookup is done for each message by the transport service itself. The sending component uses a destination name as if it were an address. The actual address of the destination component is resolved by the transport mechanism at transfer time.

Another approach is for the sending component to perform a lookup for each destination component. For example, the lookup can be done explicitly by using a supporting library in each component at startup, or just before sending the first message to a particular destination. The library may keep a table (e.g., a cache) of destination names and their corresponding destination addresses. The table can be updated as destination addresses change. Alternately, the application code of the sending component may itself ask for the lookup done by a service, and store the resulting address for later use.

The transport address format that is to be used for a particular transmission depends on the selected transport protocol. For example, for UDP and TCP transmissions, the address will be IP addresses. For Unix Sockets, the address will be a Unix path. Other transport protocols and address formats are possible.

To do the address lookup or translation, a lookup key, such as a URL, an integer or set of integers, etc., may be provided by the client to a lookup or address resolution service.

The binding, or relationship, between the lookup keys and the server addresses must be maintained somewhere in the system, for example, in one or more tables in a database. The lookup table may be consulted by the client component during lookup, and the client component may cache the returned address values. There may be one single instance of this table, but also several replicated versions of it.

The management of a system for global name-to-address translation may present a number of problems. For example, such systems may suffer from a lack of flexibility, decreased efficiency, and/or large memory and/or bandwidth requirements.

SUMMARY

Methods of looking up an address of a target server component according to some embodiments include receiving a first lookup request from a client component at a first lookup server that manages a first database that contains data relating to a first plurality of server components. The first lookup request identifies the target server component, which is among the first plurality of server components. The methods further include retrieving first metadata relating to the target server component from the first database, and sending a second lookup request including the first metadata to a second lookup server that manages a second database that contains data relating to a second plurality of server components. The second plurality of server components is a subset of the first plurality of server components and includes the target server component.

The methods further include retrieving second metadata relating to the target server component from the second database. The first and second metadata together include information that can be used to resolve an address associated with the target server component. The methods further include transmitting a response based on the first and second metadata to the client component.

The first lookup request may include a lookup key that identifies the target server component. The lookup key may include a type of the target server component. The second lookup request may include the lookup key.

The first metadata may identify a node to which a system that hosts the target server component belongs, and the second metadata may identify a port on the system that is associated with the target server component.

Transmitting the response to the client component may include transmitting the first and second metadata to the client component.

The methods may further include generating an address of the server component in response to the first and second metadata, and transmitting the response to the client component may include transmitting the address of the server component to the client component.

The first lookup request may include meta-metadata that instructs the second lookup server how to process the first metadata and the second metadata.

The methods may further include generating an address of the server component from the first and second metadata at the second lookup server, and transmitting the response to the client component may include transmitting the address of the server component to the client component.

The methods may further include appending meta-metadata to the second lookup request before sending the second lookup request to the second lookup server.

A method of looking up an address according to some embodiments includes receiving a lookup request from a client component for a target server component of an identified type at a lookup server that manages a first database that identifies nodes that contain address resolution information regarding the identified type of server component, identifying a node associated with the identified type of server component, retrieving first metadata from the first database relating to the identified type of server component, appending the first metadata to the lookup request and forwarding the lookup request to a second lookup server that manages a second database associated with the identified node.

The method further includes retrieving second metadata from the second table, the first and second metadata together including information that can be used to resolve an address associated with the target server component, and transmitting the first and second metadata to the client component.

The method may further include appending meta-metadata to the lookup request before forwarding the lookup request to the second lookup server, the meta-metadata instructing the second lookup server how to process the first metadata.

Some embodiments provide methods of binding an address of a publishing server component to a lookup key in an inter-process communication system. The methods include receiving a first publication request from a publishing server component at a first lookup server that manages a first database that contains data relating to a first plurality of server components that includes the publishing server component. The first publication request includes first and second metadata relating to an address of the publishing server component. The methods further include storing the first metadata in the first database and sending a second publication request including the second metadata to a second lookup server that manages a second database that contains data relating to a second plurality of server components. The second plurality of server components is a superset of the first plurality of server components and includes the publishing server component. The methods further include storing the second metadata in the second database.

The first metadata may include a node in which the publishing server component is resident and the second metadata may include a port associated with the publishing server component.

The first publication request may include the lookup key. The lookup key may include a type associated with the publishing server component and a process instance associated with the publishing server component. The lookup key may include a suite of process instances associated with the publishing server component.

The first publication request may include meta-metadata that instructs the first lookup server and/or the second lookup server on how to manage the first metadata and/or the second metadata. The second publication request may also include the meta-metadata.

The first lookup server may generate meta-metadata that instructs the second lookup server on how to manage the second metadata, and the second publication request may include the meta-metadata.

An interprocess communication system according to some embodiments includes a first lookup server that is configured to manage a first database that contains data relating to a first plurality of server components, and configured to receive a first lookup request identifying a target server component from among the first plurality of server components from a client component, and configured to retrieve first metadata relating to the target server component from the first database.

The system further includes a second lookup server that is configured to manage a second database that contains data relating to a second plurality of server components. The second plurality of server components is a subset of the first plurality of server components and includes the target server component.

The first lookup server is further configured to send a second lookup request including the first metadata to the second lookup server, and the second lookup server is further configured to retrieve second metadata relating to the target server component from the second database. The first and second metadata together include information that can be used to resolve an address associated with the target server component. The second lookup server is further configured to transmit a response to the client component based on the first and second metadata.

An interprocess communication system according to further embodiments includes a first lookup server that is configured to manage a first database that contains data relating to a first plurality of server components that includes a publishing server component, and that is configured to receive a first publication request from the publishing server component. The first publication request includes first and second metadata relating to an address of the publishing server component and a lookup key associated with the publishing server component. The first lookup server is further configured to store the first metadata in the first database along with the lookup key.

The system includes a second lookup server that is configured to manage a second database that contains data relating to a second plurality of server components. The second plurality of server components is a superset of the first plurality of server components and includes the publishing server component. The first lookup server is further configured to send a second publication request including the second metadata and the lookup key to a second lookup server, and the second lookup server is configured to store the second metadata in the second database together with the lookup key.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Embodiments of the present invention are described herein with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Some embodiments of the invention provide systems/methods for inter-process communications that employ a set of hierarchical name tables that are arranged so that all instances of the tables do not need to keep all information about the name-to-address bindings. Information in the tables may be distributed as far as necessary or desired in the system, but not further, thus potentially reducing memory consumption and/or bandwidth consumption in the system.

Figure 1A:
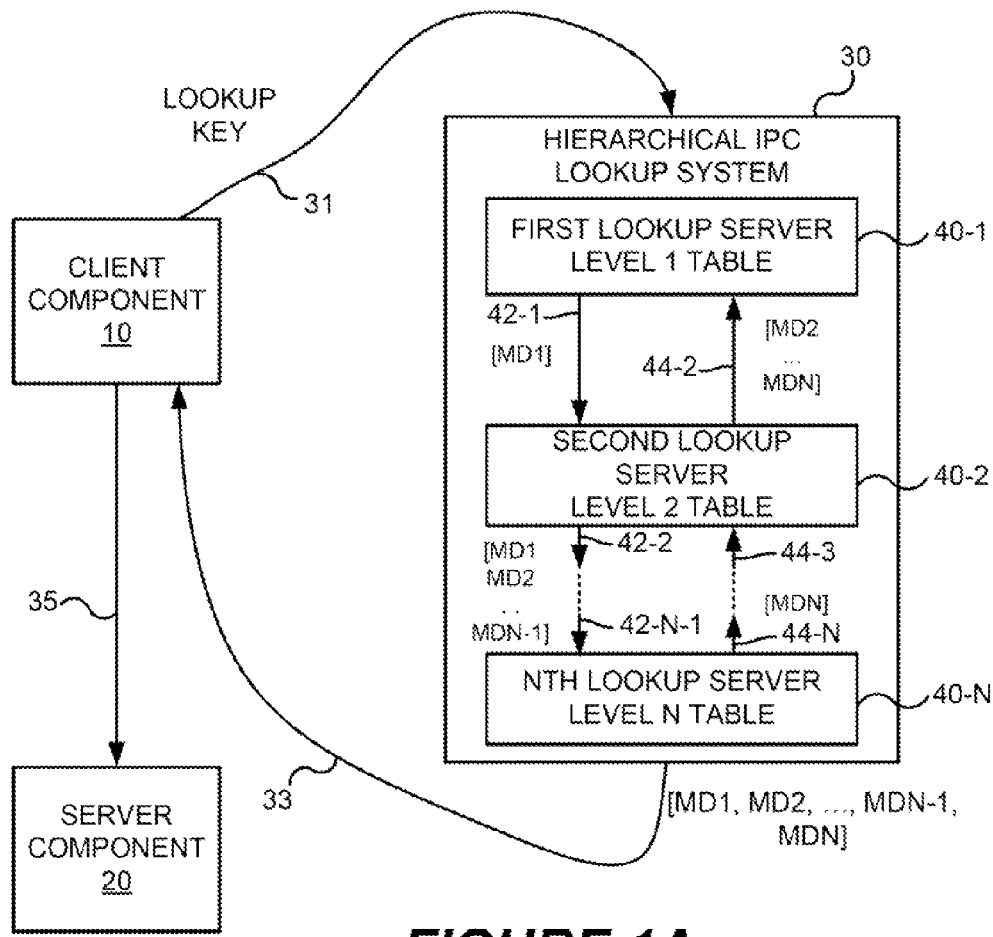
FIG. 1A is a schematic illustration of systems/methods according to some embodiments.
Figure 1B:
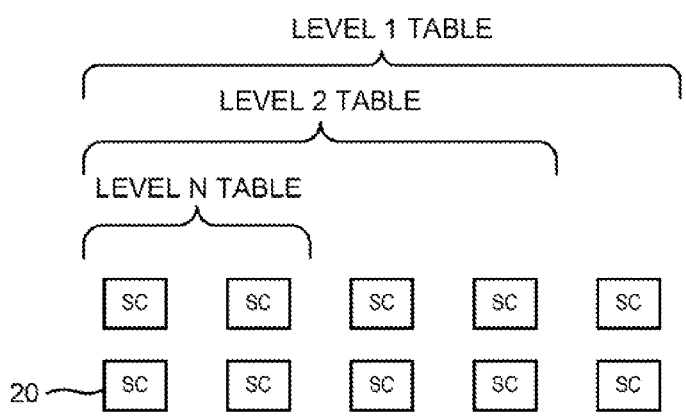
FIG. 1B illustrates a logical hierarchy of lookup tables as it relates to components managed by a hierarchical lookup system in accordance with some embodiments.
Figure 1C:
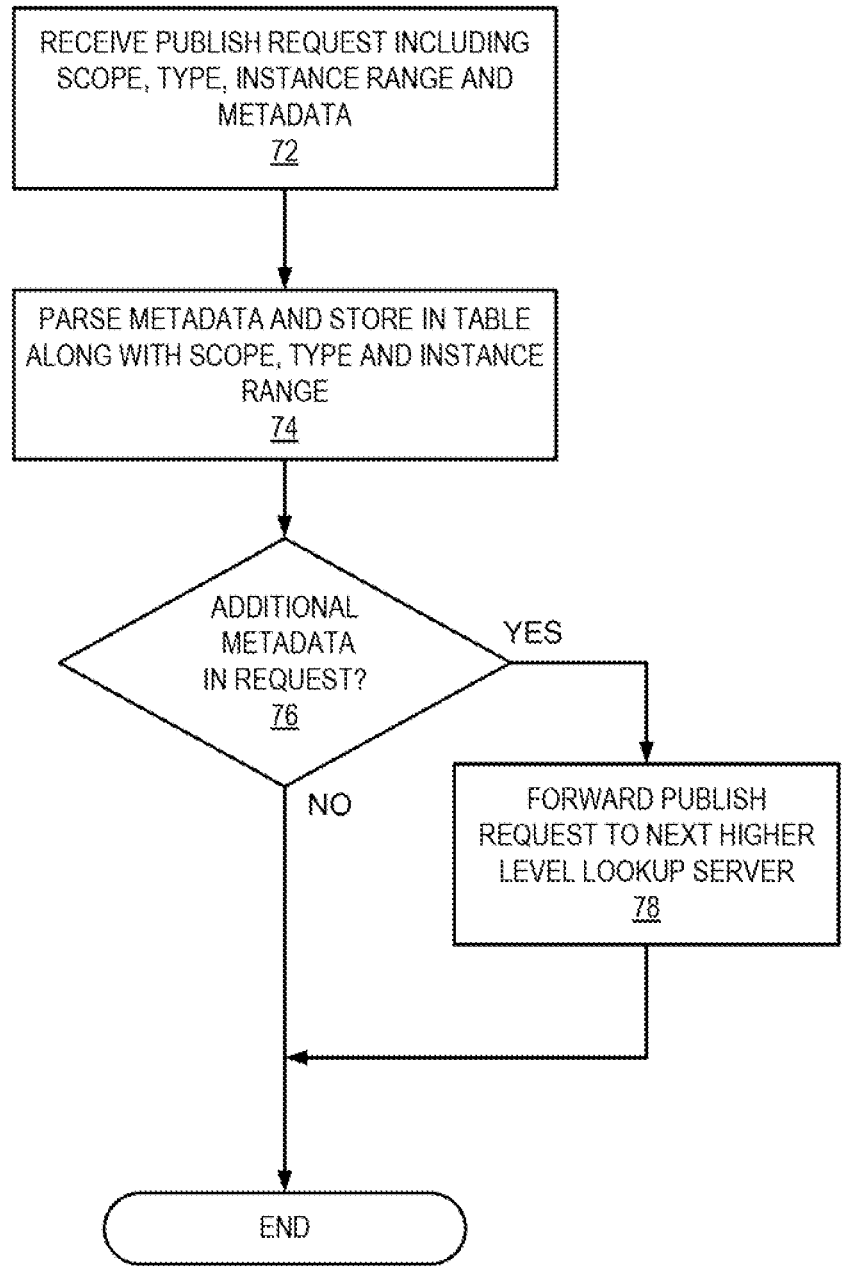
FIGS. 1C and 1D are flowcharts illustrating operations of systems/methods according to some embodiments.
Figure 1D:
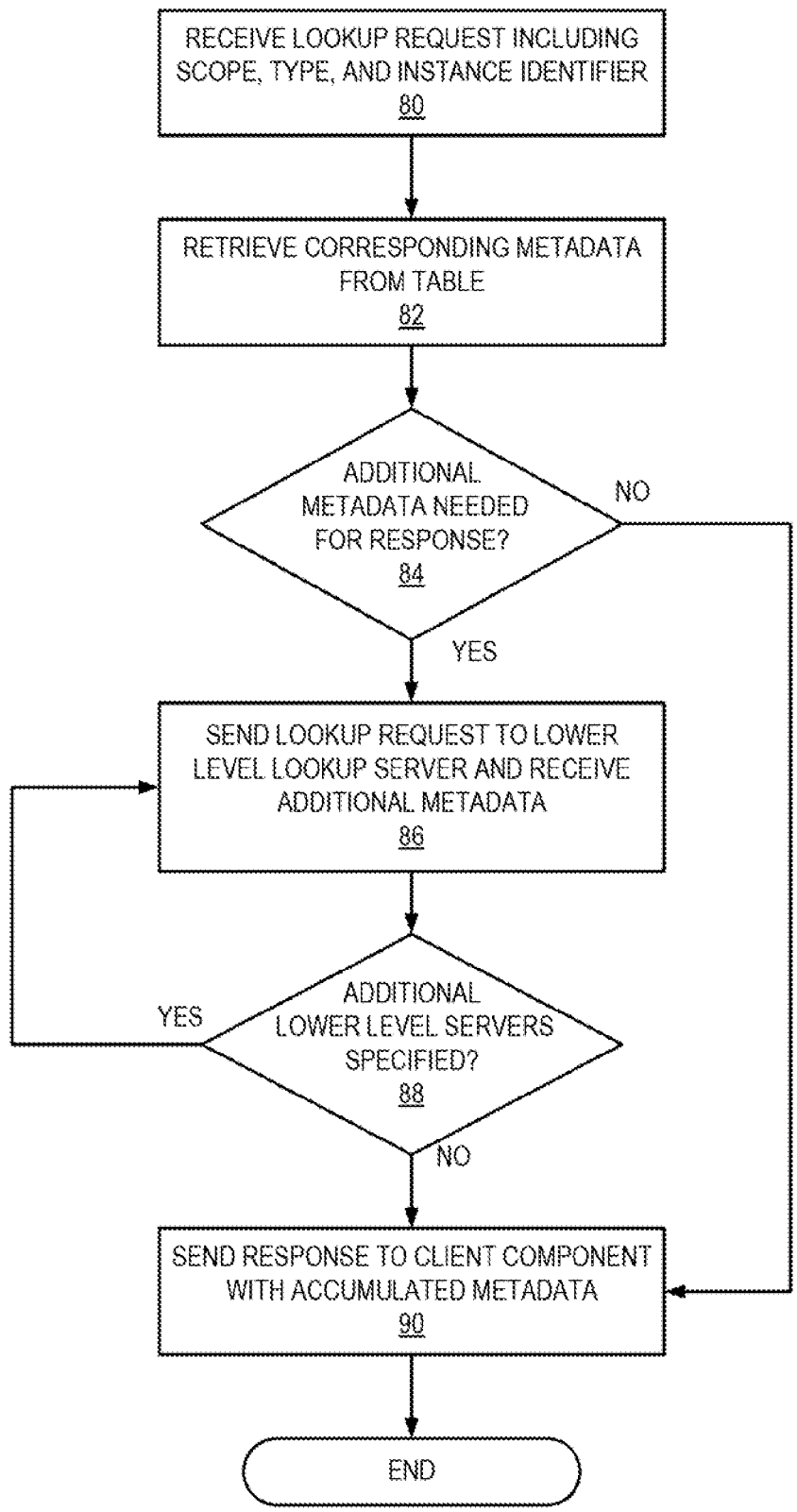

According to some embodiments, systems/methods are provided for storing, managing and looking up addresses, such as addresses of servers in a computer communication system. For example, FIG. 1A illustrates a system in which a client component 10 desires to look up an address of a server component 20 using a hierarchical inter-process communication (IPC) lookup system 30. FIG. 1B illustrates a logical hierarchy of lookup tables as it relates to a set of server components SC that are known to the hierarchical lookup system 30. FIG. 1C is a flowchart that illustrates operations associated with publishing an address to the IPC lookup system 30 and binding the address to a lookup key, while FIG. 1D is a flowchart that illustrates operations associated with looking up an address in the IPC lookup system 30.

FIG. 1A is a schematic illustration showing the logical relationship of the client component 10, a server component 20 and the IPC lookup system 30, and does not indicate the physical relationship between the components. The components can exist as software components in a single computer system, in the same or different partitions of a single computer system and/or in distributed computer systems that are coupled together by a communication network. Moreover, the components of the IPC lookup system 30 may be located in a single computer system, in the same or different partitions of a single computer system and/or in distributed computer systems that are coupled together by a communication network Referring to FIGS. 1A and 1B, the client component 10 issues a lookup request 31 to a high level lookup server 40-1 in the IPC lookup system 30 that manages a high level table, i.e. a Level 1 Table. As shown in FIG. 1B, the high level Level 1 Table contains metadata that relates to set of server components SC including the server component 20.

The lookup request 31 includes a lookup key, which may, for example, be the name of the server component 20 whose address is sought by the client component 10.

The high level lookup server 40-1 retrieves a record from the high level table containing metadata MD1 that relates to a particular instance of the server component 20. If the information is incomplete, the high level lookup server 40-1 sends a lookup request 42-1 to a lower level lookup server 40-2 along with the metadata MD1. The identity of the lower level lookup server 40-2 and or an associated lookup table may be determined in some embodiments from the metadata MD1.

The second level lookup server 40-2 retrieves further information regarding the record from a lower level table (the Level 2 Table), including metadata MD2. As shown in FIG. 1B, the Level 2 Table contains metadata that relates to a subset of server components that are known to the Level 1 Table. If the information is still incomplete, the second level lookup server 40-2 sends a lookup request 42-2 including the metadata [MD1, MD2] collected to that point the next lower level lookup server. The identity of the next lower level lookup server and or an associated lookup table may be determined in some embodiments from the metadata [MD1, MD2].

This process may be repeated by sending the collected metadata to lower level lookup servers that manage lower level tables until a lowest level table, i.e., the Level N Table shown in FIGS. 1A and 1B, is reached. In the example shown in FIG. 1A, the Level N lookup server 40-N receives a lookup request 42-N-1 from a next higher level lookup server that includes the metadata [MD1, MD2, . . . , MDN-1] collected up to that point.

Each lower level table contains metadata that relates to a subset of server components that are known to the next higher level table and that includes the server component 20 identified by the lookup key contained in the lookup request 31.

The Level N table may return the metadata MDN stored therein to the next highest level table via a response message 44-N, as shown in FIG. 1A. Each subsequent level may return the accumulated metadata via response messages 44-3, 44-2, etc., until the complete set of collected metadata [MD2, . . . , MDN-1, MDN] is returned to the highest level lookup server 40-1 in the IPC lookup system 30.

If a particular lookup table includes multiple entries corresponding to a set of metadata provided by a higher level lookup server, the lookup server for that level may issue multiple lookup requests, e.g. one for each table entry corresponding to the set of metadata, to lower level lookup servers and accumulate all of the metadata collected in response to the multiple lookup requests in formulating its response to the higher level server.

Once the accumulation of metadata by the IPC lookup system 30 is complete, the IPC lookup system 30 returns a response 33 to the client component including the accumulated metadata MD1 to MDN, which the client component 10 may use for reconstructing the address of the server component 20. The client component 10 may then send a message 35 to the server component 20 using the reconstructed address.

FIG. 1C is a flowchart that illustrates operations of a lookup server 40-1, 40-2, etc., in an IPC lookup system 30 associated with publishing an address of a server component 20. As shown therein, a lookup server 40-1, 40-2, etc., receives a Publish request that specifies information about a server component 20, such as the server component's scope, server type and instance range, all of which are discussed in more detail below (Block 72). The Publish request may be received from the server component 20 or may be received from a lower level lookup server 40-1, 40-2, etc. The Publish request also includes metadata supplied by the server component 20 that can be used by a client component 10 to reconstruct the address of the server component 20. The lookup server 40-1, 40-2, etc., parses the metadata from the Publish request and may store at least a portion of the metadata in its local name table along with the specified information about the server component 20 (Block 74), although in some embodiments it may not store any metadata in the local name table.

The metadata may be parsed according to pre-determined rules stored in the lookup server 40-1, 40-2, etc., or may be parsed in accordance with instructions or meta-metadata supplied in the Publish request as described in more detail below.

The lookup server 40-1, 40-2, etc., then determines if there is additional metadata in the request that needs to be propagated to a higher level lookup server (Block 76). If so, the Publish request including the additional metadata is forwarded to the higher level lookup server (Block 78). However, the metadata processed and stored by the original lookup server need not be sent to the higher level lookup server.

FIG. 1D is a flowchart that illustrates operations of a lookup server 40-1, 40-2, etc., in an IPC lookup system 30 associated with looking up an address of a server component 20. As shown therein, a lookup server 40-1, 40-2, etc., receives a Lookup request (Block 80). The Lookup request may be received from a client component 10 or from a higher level lookup server 40-1, 40-2, etc. The Lookup request may identify the desired server component by scope and name, which may include a type and instance identifier of the server component.

In response to the Lookup request, the lookup server 40-1, 40-2, etc., checks its local table and retrieves a record corresponding to the provided scope and name of the desired server (Block 82). The lookup server 40-1, 40-2, etc. retrieves the metadata from the record and analyzes the record and the retrieved metadata to determine if additional metadata is needed in order to formulate a response to the Lookup request (Block 84). Analysis of the record and the retrieved metadata may be based on predetermined instructions known to the lookup server and/or may be based on meta-metadata provided in the Lookup request and/or in the record itself.

If no additional metadata is needed, the lookup server 40-1, 40-2, etc. sends a response to the client component including the accumulated metadata from which the client component can reconstruct the address of the desired server component (Block 90).

If additional metadata is needed to formulate a response to the Lookup request, the lookup server 40-1, 40-2, etc. sends a lookup request and the retrieved metadata to a lower level lookup server specified in the record and receives additional metadata from the lower level lookup server in response (Block 86).

The lookup server then checks to see if additional lower level lookup servers are indicated in its table as corresponding to the desired server (Block 88). If there is an additional matching record indicating another lower level lookup server, operations return to Block 86 and another lookup request is sent. If no additional lower level lookup servers are indicated in the lookup table, the lookup server 40-1, 40-2, etc. sends a response to the client component including the accumulated metadata from which the client component can reconstruct the address of the desired server component (Block 90).

Figure 2:
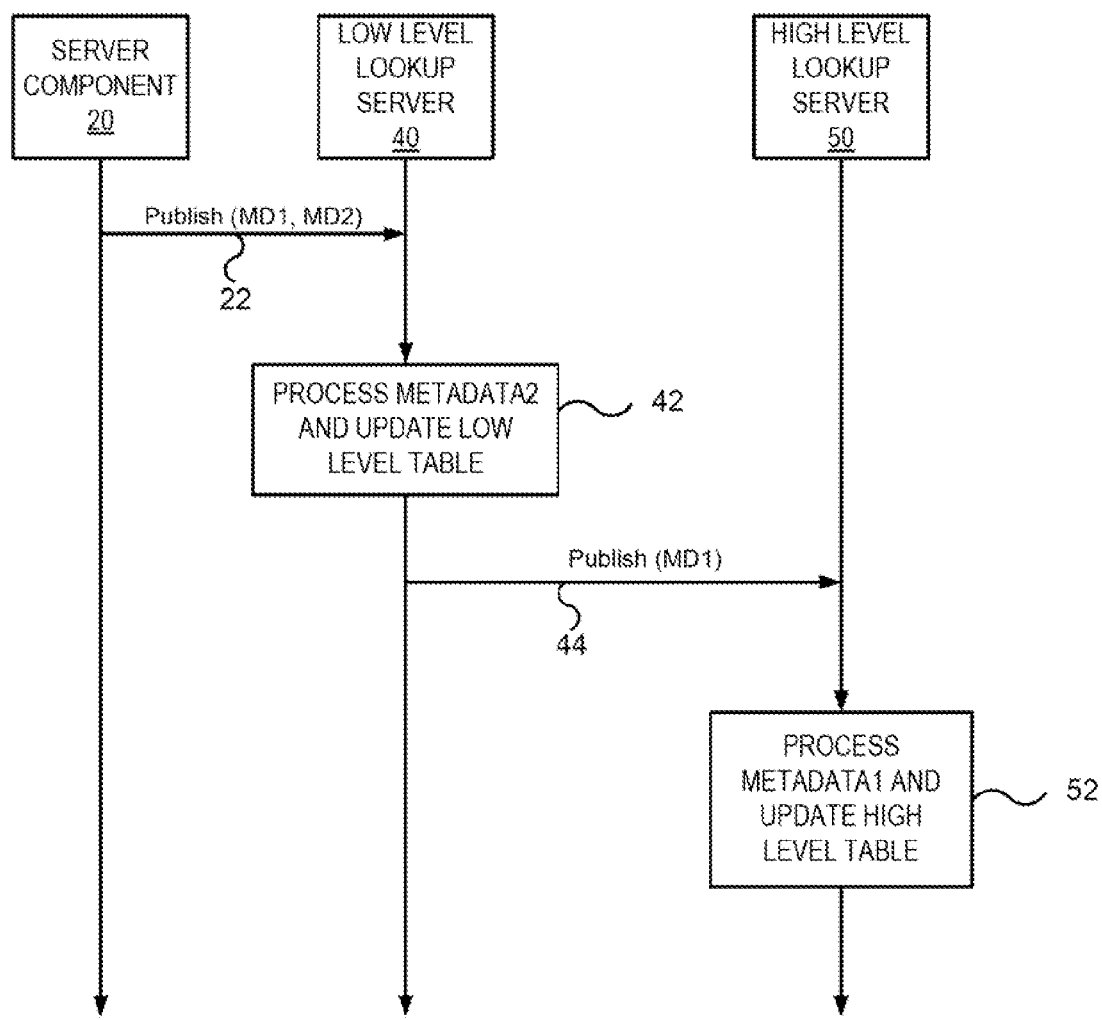
FIG. 2 is a flow diagram illustrating a binding or publication process in accordance with some embodiments.

FIG. 2 is a flow diagram illustrating a binding or publication process in accordance with some embodiments. In the binding or publication process, a server component 20 publishes its address to the IPC lookup system so that it is available to client components that utilize the IPC lookup system.

Referring to FIG. 2, the server component 20 may issue a Publish command 22 to a low level lookup server 40 associated with the server component 20. The Publish command may contain one or more metadata fields MD1, MD2 that can be used by client components to reconstruct the address of the server component 20.

The format of the metadata fields is arbitrary, and needs to be known only to the server component 20 and the client components. The IPC lookup system 30 does not need to know what the metadata references; rather, the IPC lookup system 30 only needs to know how to process and store the metadata for a particular type of server component. Techniques for providing the IPC lookup system 30 with instructions for managing the metadata are discussed in more detail below.

Still referring to FIG. 2, the publish command 22 is received by the low level lookup server 40, which processes a portion of the metadata, e.g., metadata MD2, and updates a low level table managed by the low level lookup server 40 (block 42). For example, in some embodiments, the low level lookup server 40 may store the metadata MD2 in the low level table in an entry associated with the server component 20.

The low level lookup server 40 may then publish the remaining metadata MD1 to a higher level lookup server 50 via a publication message 44. The high level lookup server 50 may then process the metadata MD1 and update the high level table (block 52). For example, the high level lookup server may store the metadata MD1 in the high level table in an entry associated with the low level lookup server 40.

Figure 3:
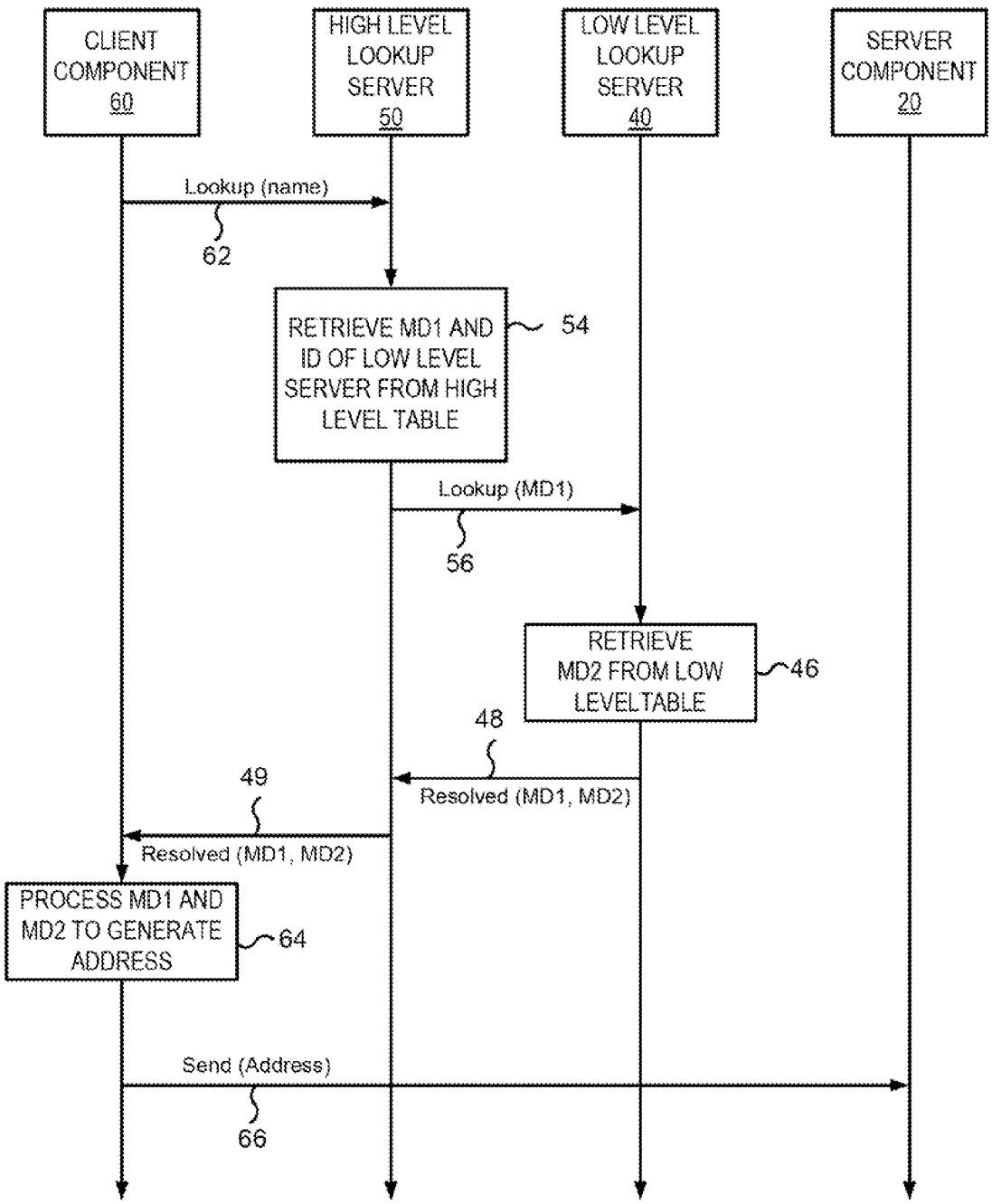
FIG. 3 illustrates an example of a lookup request in accordance with some embodiments.

FIG. 3 illustrates an example of a lookup request in accordance with some embodiments. A client component 60 issues a lookup request 62 that includes the name of a server component 20 to a high level lookup server 50. The high level lookup server 50 may analyze the lookup request and responsively retrieve metadata MD1 and determine the identity of a low level lookup server associated with the server component 20 from a high level table (block 54).

The high level lookup server 50 may then issue a lookup request 56 to the low level lookup server. The lookup request 56 may include the metadata MD1 retrieved from the high level table in block 54.

Upon receipt of the lookup request 56 from the high level lookup server 50, the low level lookup server 40 may retrieve metadata MD2 from the low level table (block 46), and may send a Resolved message 48 back to the high level lookup server 50 that contains at least the metadata MD2, but may include both MD1 and MD2. The high level lookup server 50 may then send a Resolved message 49 back to the client component 60 that contains both metadata MD1 and metadata MD2.

The client component 20 may process the metadata MD1, MD2 to generate an address for the server component 20 (block 64) and then send a message 66 to the server component 20 using the resolved address.

Figure 4:
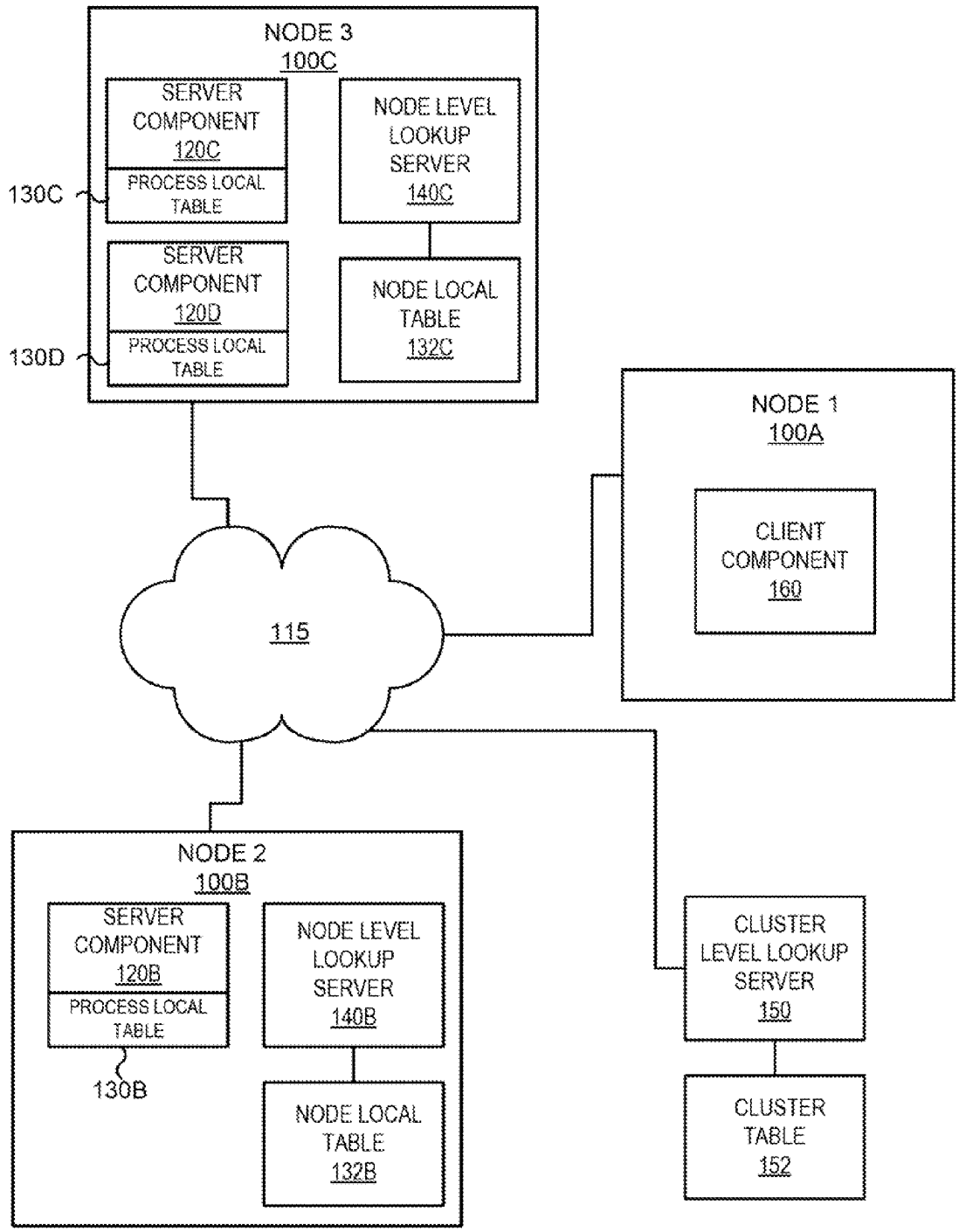
FIG. 4 is a schematic block diagram of a system according to some embodiments that includes a cluster of nodes in which various client and server components are located.

Further examples are illustrated in FIGS. 4-9. In particular, FIG. 4 is a schematic block diagram of a system according to some embodiments that includes a cluster of nodes 100A, 100B and 100C in which various client and server components are located. Each node may represent a separate computing system, a separate partition within a single computing system, etc.

In the example illustrated in FIG. 4, a first node 100A (Node 1), hosts a client component 160. A second node 100B (Node 2), hosts a server component 120B, while a third node 100C (Node 3), hosts server components 120C and 120D.

Each server component 120B, 120C, 120D, includes or is associated with a low level table, namely, process local tables 130B, 130C and 130D that store information relating to processes handled by their associated server components.

Node 2 includes a node level lookup server 140B and an associated node local table I 32B, while Node 3 includes a node level lookup server 140C and an associated node local table 132C. The node level tables 132B, 132C are higher level tables than the process local tables 130B-130D, and store information relating to multiple server components within their associated nodes.

A cluster level lookup server 150 manages a cluster table 152, which represents the highest level table in the system illustrated in FIG. 4. The cluster table 152 stores information regarding server components within the all of nodes in the cluster. Although illustrated as a standalone component, the cluster level lookup server 150 may be hosted in one of the nodes.

The nodes 100A to 100C and the cluster level lookup server communicate with one another over a communication network 115, which may, for example, include a system bus, a wide area network, a local area network, the Internet or any other communication pathway.

In the examples illustrated in FIGS. 4-9, a logical key format is used that consists of two integers. One integer represents the type of functionality associated with the name, and the other integer represents the instance of that functionality, e.g. a process, that is being contacted. This just an example of a format, and other formats are possible. In the following discussion, the logical key that is used for server address lookup is referred to as a "destination name" or simply a "name."

In order to keep the size of the lookup tables down, and to limit the size and frequency of updates having to be distributed between nodes, it may be desirable to treat multiple instances of a particular server functionality type as suites, and only distribute and store information regarding suites of instances instead of information regarding individual instances. This may be facilitated by keeping instances numerically adjacent, which can be achieved either through rigorous application design, or by using an offline or run-time identity provider. An IPC application programming interface (API) for a system according to some embodiments may support, and even enforce, the use of such a concept.

Figure 5:
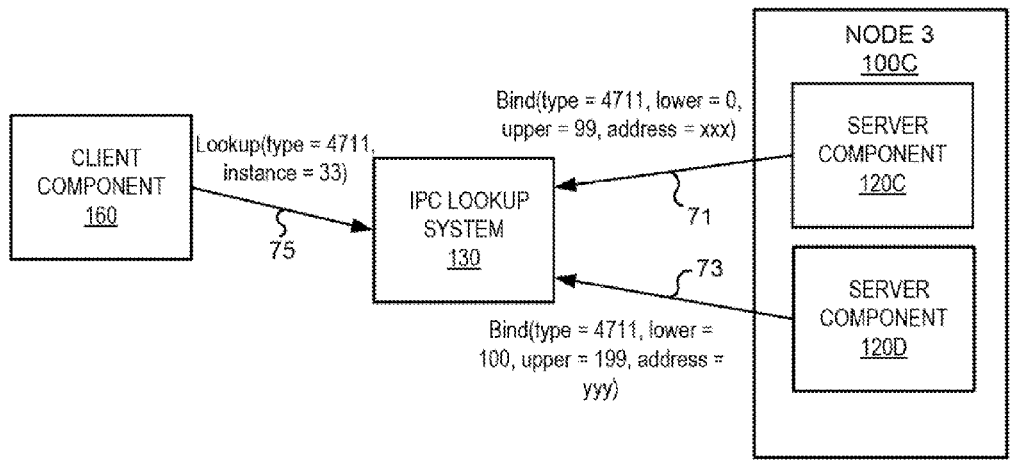
FIG. 5 is a schematic illustration of portions of a system according to some embodiments including a client component, an inter process communication lookup system, and a node including a plurality of server components.

The key/name scheme used as an example herein is used as shown in FIG. 5. As shown therein, a system may include a client component 160, a first server component 120C that is resident in a first partition of a node (e.g., Partition A of Node 3) and a second server component 120D that is resident in a second partition of a node (e.g., Partition B of Node 3).

In the example illustrated in FIG. 5, the lookup key consists of a type and an instance identifier, while a destination is given the ability to bind to a key range, by indicating the upper/lower bound of the range.

The first server component 120C binds its address (addr=xxx) to a server type (4711) and a range of instances [0:99] via a Publish command (such as a bind call) 71 to the IPC lookup system 130. The second server component 120D binds its address (addr=yyy) to the same server type (4711) and a different range of instances [100:199] via a bind call 73 to the IPC lookup system 130.

The client component 160 may desire to send a message to a server indicated by server type=4711 and instance=33. The client component 160 would therefore send a lookup request 75 to the IPC lookup system 130. The lookup request includes the two-integer name of the server, i.e. server type=4711 and instance=33, as the lookup key. The IPC lookup system would thus return the address (addr=xxx) of the first server component 120C, since that server component has the correct server type and hosts the instance identified in the lookup request.

Since the type of endpoint represented by a destination name is defined by the user application, it is also possible that the structure of the name may be defined by the application. Therefore, in addition to or instead of the two integer format described above, systems/methods according to some embodiments may allow for a superset of user-defined name formats. The lookup and translation process may be slightly less efficient in such an approach due to increased overhead requirements. However, for some applications, the lookup efficiency may be less important than the flexibility of having a custom name format.

In systems/methods according to some embodiments, the lookup table to be used by the IPC system can be seen as a generic database that provides the ability to bind or associate user data (i.e., metadata) to a lookup key. The format of the key must be known by the system/database server, while the format and semantics of the metadata may be opaque, and may only be known by the application issuing and using it.

For example, the IPC system may be regarded as only one such application among others and having its own interpretation of the metadata. However, in systems/methods according to some embodiments, some of the metadata may represent a destination address, while other metadata may represent other data, such as, for example, the execution state of the destination component (e.g., active/standby/reserve).

To avoid exhausting the key space, and to easily separate the different services, the database may be sub-divided into name spaces, e.g. "IPC", "Virtual Router #8", "OSPF", or any other desired name space, without prescribing any particular format for the name space identifier. Inside each name space, the lookup key may have a format that can be interpreted by the lookup server. The name spaces may have one or a few fixed formats, or may have formats that are themselves described by metadata, e.g. XML. For an IPC service, a simple, fixed format may be a suitable approach.

In order to reduce signaling intensity and/or memory footprint, it may be desirable to define which metadata should be propagated to which level in the hierarchy. Such a property may be determined not only on a "need-to-know" basis, but also on the assumed update frequency of each part of the metadata. In the examples illustrated in FIGS. 4-9, a three level lookup hierarchy is illustrated. However, the principle may apply to a lookup system having any number of levels FIGS. 6-9 illustrate specific examples of publication/bind processes (FIGS. 6 and 7) and lookup processes (FIGS. 8 and 9) in accordance with some embodiments that use a system as illustrated in FIG. 4.

Figure 6:
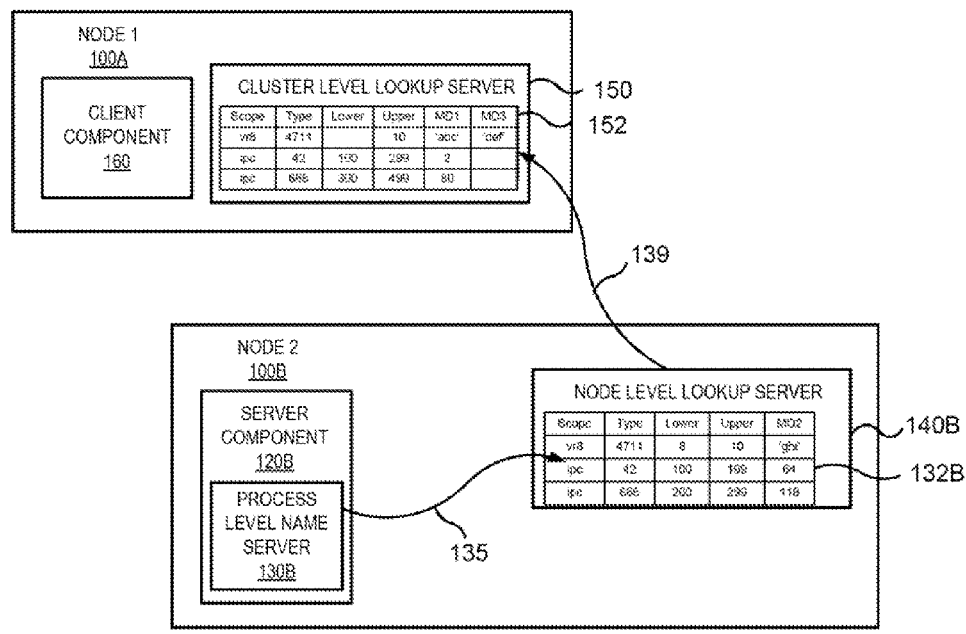
FIG. 6 is a schematic illustration of portions of a system according to some embodiments including a client component and a server component.

In particular, FIG. 6 illustrates a system including two nodes, Node 1 100A and Node 2 100B. A client component 160 resides in Node 1 along with a cluster level lookup server 150 which manages a cluster level table 152, which is the highest level table in the system illustrated in FIG. 6.

A server component 1208 resides in Node 2. The server component 120B also includes a process local table 130B, which represents the lowest level table in the system illustrated in FIG. 6. The process local table 130B refers to objects (e.g. instances or flows) that are operated by the server component 120B. Those instances are enumerated 100 to 199 in this example. Although virtually addressable all the time, these objects (instances) only need to exist when there is any need for them. Hence, when an object is created or deleted, an operation that may be frequent, only the process local lookup table needs to be updated, and the impact on the overall system may be minimal.

Node 2 also includes a node level lookup server 140B that manages a node level table 132B, which is intermediate the process local table 130B and the cluster level table 152 in the IPC table hierarchy.

The node level table 132B contains references to all the local processes in the node. The only extra information this table needs to keep is the port number to reach the process in question. The table stores those port numbers (64 and 118 in the example) as first metadata MD1, without knowing anything about their meaning. The table does not necessarily store the node identity of the destination processes. This table only needs to be updated when a process with a new range and port number, on the same node, is created or killed.

In the example illustrated in FIG. 6, the node level table 132B stores records that identify processes by scope, type, and lower and upper instance range boundaries. In the example illustrated in FIG. 6, the node level table 132B includes two records for servers having the scope "IPC." The first IPC record indicates a server type of "42" and an instance range of 100 to 199. The metadata MD2, which refers to the port of the server, is "64." The second IPC record indicates a server type of "42" and an instance range of 200 to 299 with metadata MD2 of "118."

The node level table 132B also includes an entry for a server having the scope of "VR8." That entry indicates a server type of 4711 with an instance range of 8-10. However the metadata MD2 stored with this entry is the alphanumeric string "ghi." Thus, it is understood that the metadata MD2 has a different meaning for servers within the VR8 scope than it does for IPC-scope servers. The meaning attached to the metadata MD2 may only be important to clients and servers within that scope, however, and it need not be known to the IPC lookup system.

The highest level in the example shown in FIGS. 6-9 is the cluster level table 152, which is managed by a cluster level lookup server 150 in Node 1. The cluster level table 152 stores information indicating the process instance ranges served at particular nodes, but does not store the local port numbers used on those nodes or other information identifying the particular servers that handle those instance ranges. Hence, only the metadata representing the node address (i.e., MD1) may be propagated to this level, and the cluster level table 152 may only need to be updated whenever a node is added or removed from serving this particular server process type.

It may also be desirable for the IPC lookup system 130 to have the capability to receive and process "meta-metadata", i.e., data that describes the metadata in some way. For example, the meta-metadata may provide a way for the publisher to indicate which metadata should be propagated to a particular level. The use of meta-metadata according to some embodiments is described in more detail below.

Figure 7:
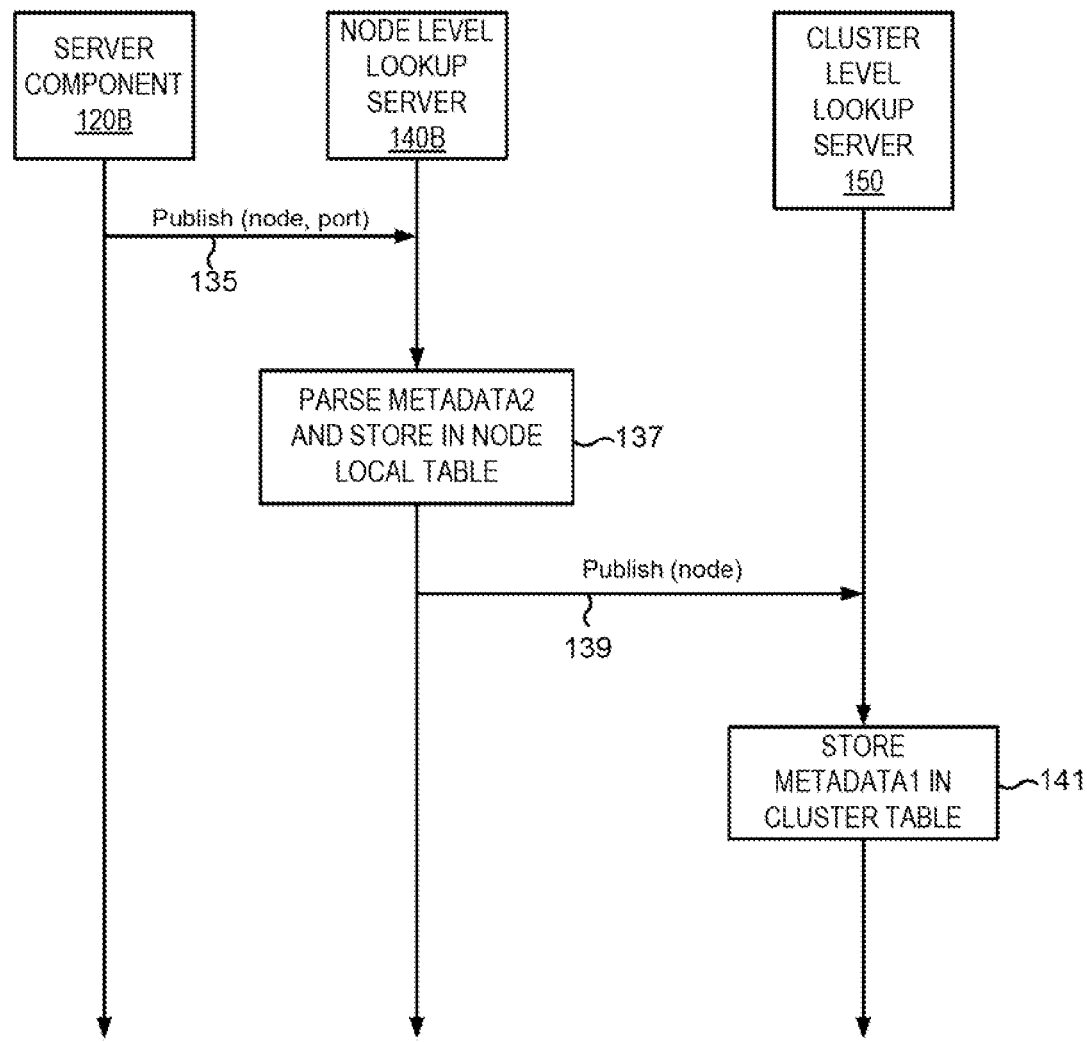
FIG. 7 is a flow diagram illustrating a binding or publication process in accordance with some embodiments.

Referring to FIGS. 6 and 7, when the server component 120B wants to publish (bind) its address to a given type and instance suite (e.g., type 42 and instance suite [100:199] in the example), the server component 120B may first issue a Publish call 135 the node level lookup server 140B. The Publish call 135 includes the node and port of the server component 120B as the metadata MD1, MD2, e.g., the Publish call 135 may have the form Publish (scope=ipc, type=42, lower=100, upper=199, md2=64, md1=2). Only the client component 160 and the server component 120B may know that md1 and md2 refer to a node and port, respectively.

The node level lookup server 140B parses the first metadata MD2 {64} from the Publish call and stores it in the node level table 132B (block 137) along with the published instance suite [100:199], and then issues a Publish call 139 to the next-level lookup server, which is the cluster level lookup server 150 in this case, that includes the metadata MD1, {2}. The form of the Publish call 139 may be Publish (scope=ipc, type=42, lower=100, upper=199, md1=2). Note that the cluster level lookup server may independently store the name of the node (Node 2) from which the Publish call was received to facilitate later forwarding of lookup requests that identify a particular record.

The cluster level lookup server 150 stores the received metadata in the cluster level table 152 (block 141). In this example, it is assumed that there already is an entry for this type (42) and for this node (2) in the cluster level table 152 published by some other server on Node 2. However, the existing entry is for the instance range [200; 299]. The cluster level lookup server 150 determines that the existing entry happens to have the same metadata as the new publication, so the two publications may be merged in the same entry, which relates to the name suite {42,[100,299]}. The entry has common metadata, and points to the same node of origin (2). If the metadata or the original node ID differ, the new publication would be placed into a new, separate entry.

Figure 8:
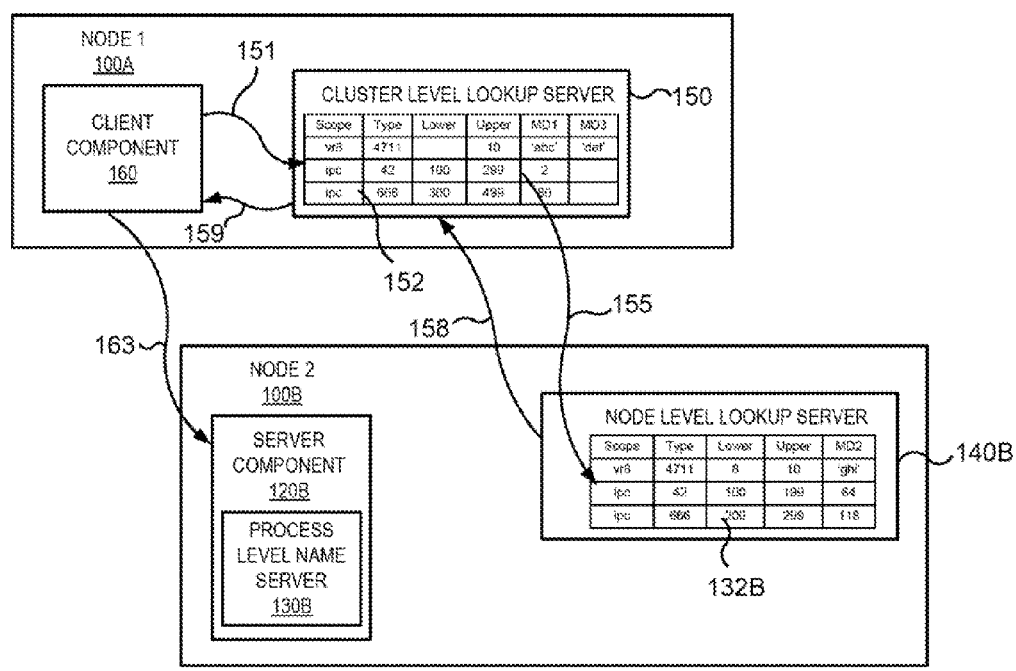
FIG. 8 is a schematic illustration of portions of a system according to some embodiments including a client component and a server component.
Figure 9:
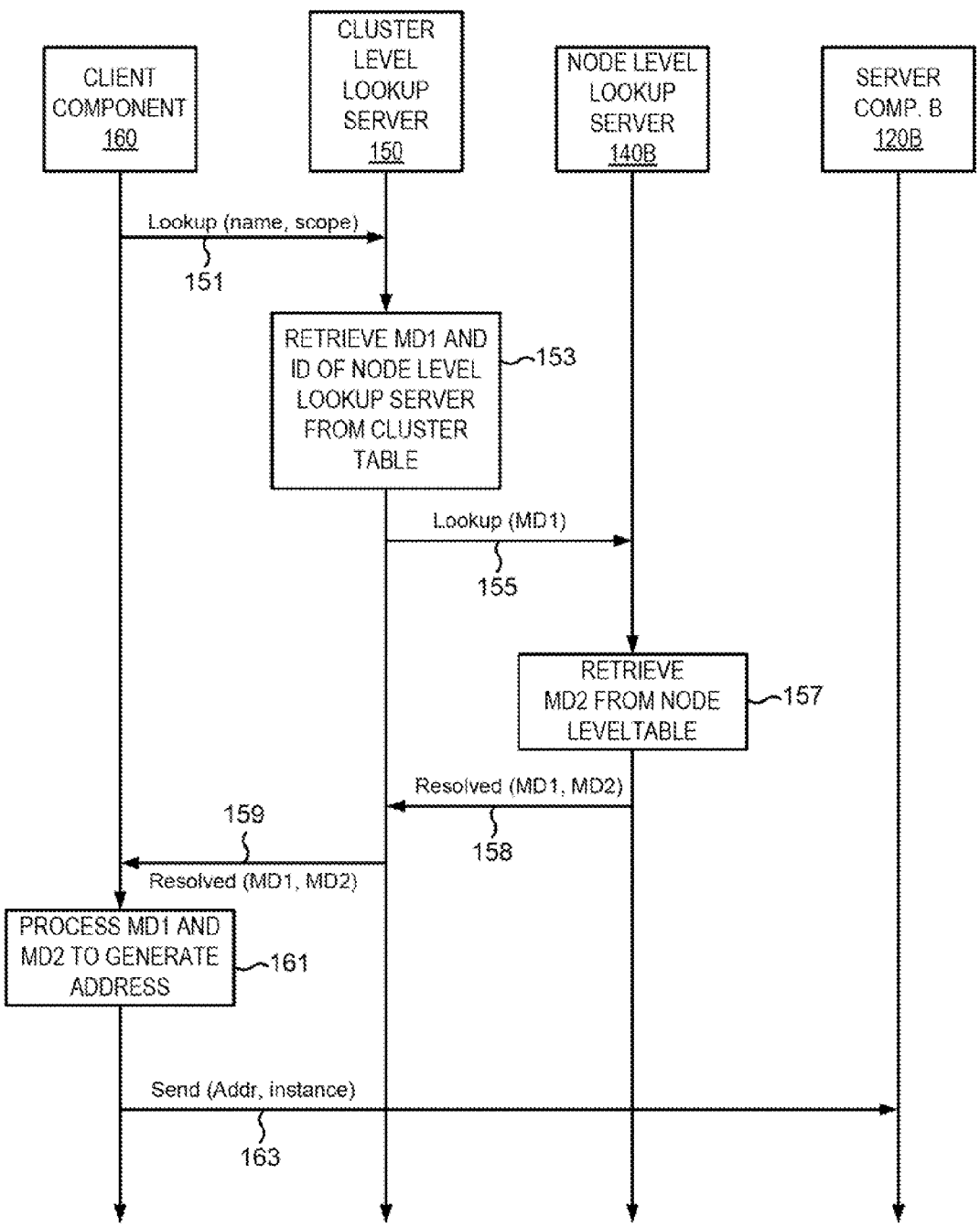
FIG. 9 is a flow diagram illustrating a lookup process in accordance with some embodiments.

FIGS. 8 and 9 illustrate operations that may occur when a client component 160 wants to send a message to a server of a given type (42 in the example). In that case, the client component 160 first calls the nearest instance of the highest level lookup server, which in this example is the cluster level lookup server 150, by issuing a lookup command 151 specifying the name of the desired server component. In this example, the name of the server component includes a two integer value of type=42 and instance=198. The lookup command 151 also specifies the scope of the desired server, which in this example is "IPC." The lookup command 151 may have the form Lookup(scope=ipc, type=42, instance=198).

The cluster level lookup server 150 retrieves the metadata MD1 from the cluster level table that corresponds to servers of the specified scope, type and instance range (block 153). The cluster level lookup server 150 does not have the full information about name type 42. However, it may determine, for example from metadata MD1, that more information about instance 198 can be found in the node level table on Node 2. Thus, the cluster level lookup server forwards the lookup request to Node 2 along with the metadata it has stored {2} to the node level lookup server 140B in Node 2 in a Lookup request 155, which may have the form Lookup (scope=ipc, type=42, instance=198, md1=2).

In response to the Lookup request 155, the node level lookup server 140B in Node 2 checks the node level table 132B and determines that the range of instances from 100 to 199 is served by a server having metadata MD2 {64}. The node level lookup server 140B then returns a Resolved message 158 to the cluster level lookup server 150 containing both the supported range ([100:199]) and the full metadata {2,64}. The Resolved message 158 may have the form Resolved(lower=100, upper=199, md2=64, md1=2). The cluster level lookup table 150 may then send a corresponding Resolved message 159 to the client component 160.

The client component 160 processes the returned metadata MD1, MD2 to generate an address for the server component 120B. In this example, the client component simply interprets the metadata MD1, MD2 as an address consisting of node and port number. The client component 160 may then send a message 163 to the server component 120E using this address. The name instance (198) that the client component wants to reach may also be sent in the message 163. The send message 163 may have the form Send (inst=198, node=2, port=64).

In the server component 132B, the local name table can translate the instance contained in the message 163 to whatever meaning it has locally, e.g. an instance, flow, thread, data object, etc. The server component can thereafter perform a task in response to the message 163.

Figure 10:
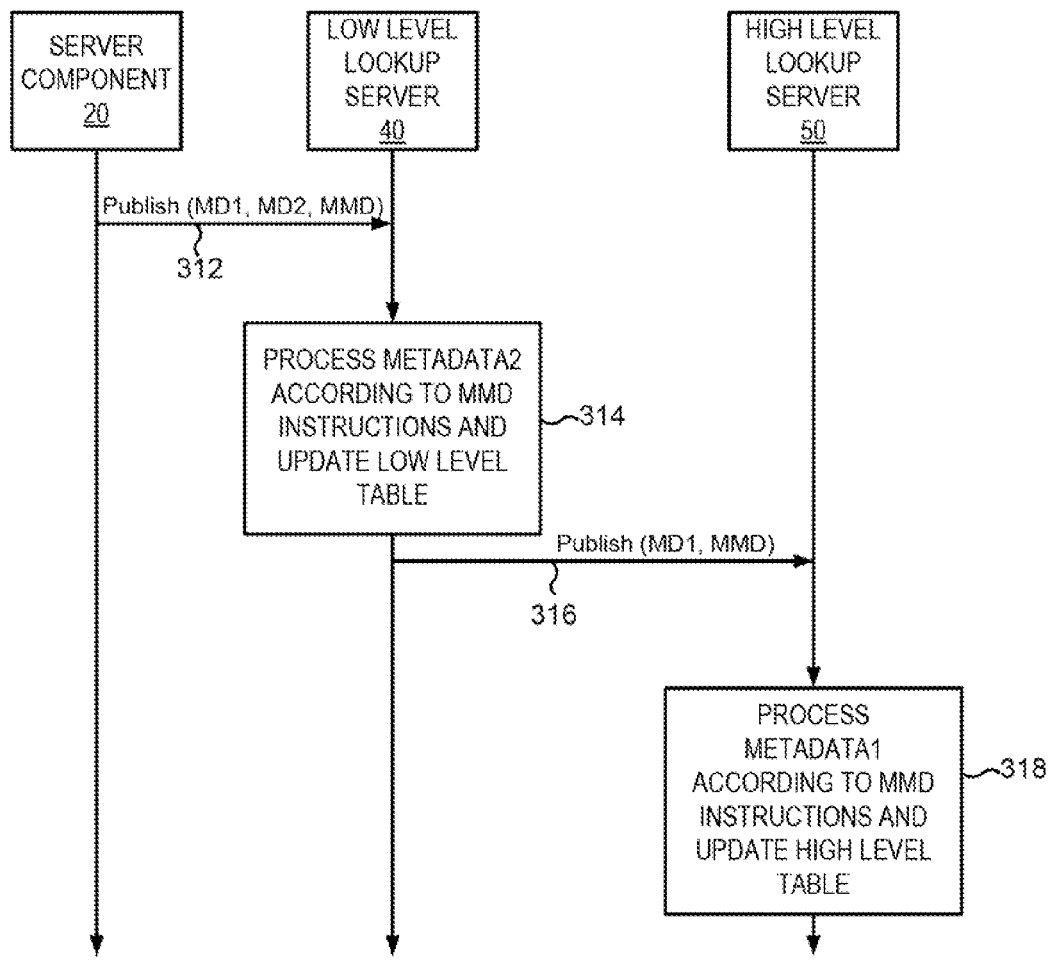
FIGS. 10 and 11 are flow diagrams illustrating operations that utilize meta-metadata for publishing an address of a server component.

FIG. 10 is a flow diagram illustrating operations for publishing an address of a server component that utilize meta-metadata. Meta-metadata includes data, instructions or other information that instructs or configures one or more lookup servers in how to handle metadata included in a Publish request. In the embodiments of FIG. 10, the meta-metadata is provided by the server component 20 that is issuing a Publish request.

Referring to FIG. 10, a server component 20 issues a Publish request 312 to a low level lookup server 40 that specifies, among other things, first and second metadata MD2, MD1, as well as meta-metadata MMD.

The low level lookup server 40 processes the metadata MD2 in accordance with the instructions and/or configuration information provided in the meta-metadata MMD and updates the associated low level name table (block 314). The low level lookup server 40 may then send a Publish request 316 including the metadata MD1 and optionally including the meta-metadata MMD to a high level lookup server 50. The high level lookup server 50 processes the metadata MD1 in accordance with the instructions and/or configuration information provided in the meta-metadata MMD and updates the associated high level name table (block 318).

Figure 11:
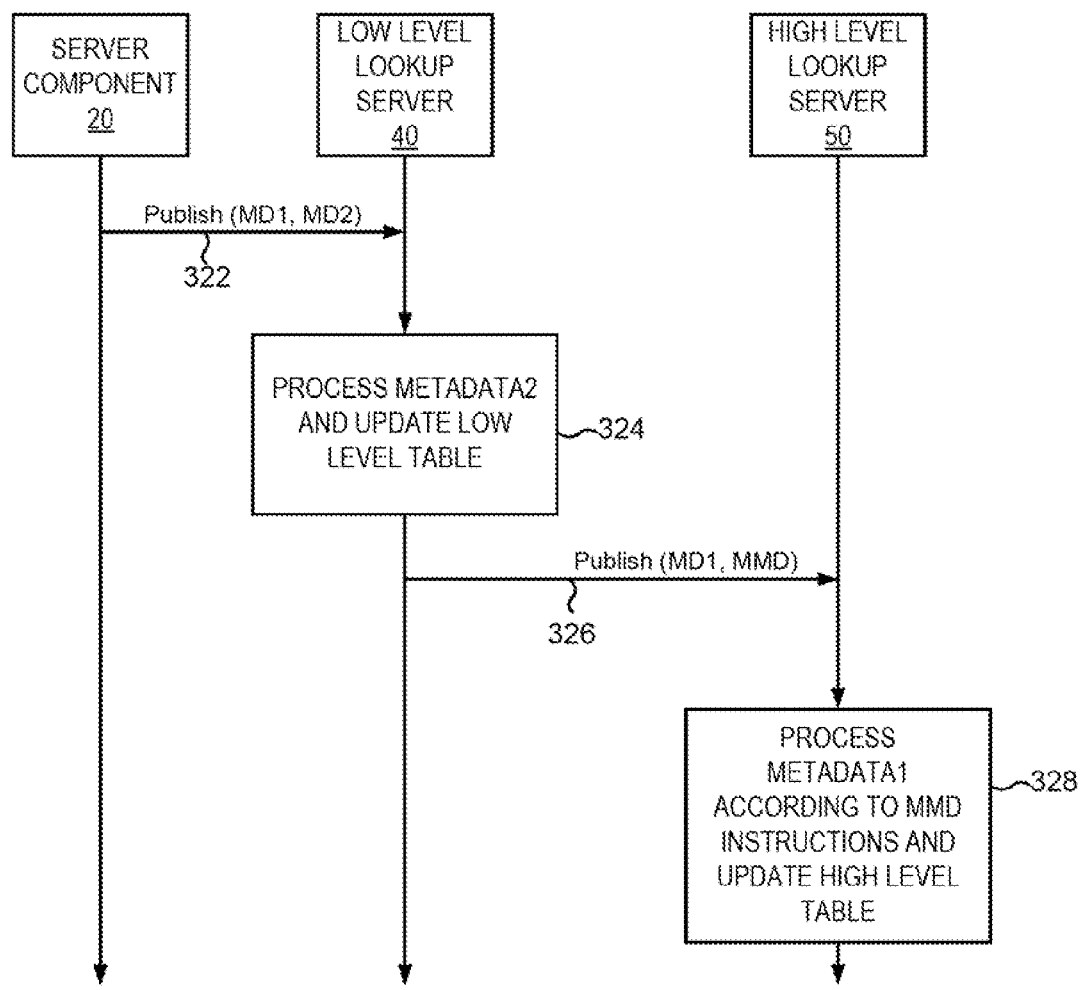

FIG. 11 is a flow diagram illustrating operations for publishing an address of a server component that utilize meta-metadata, in which the meta-metadata is provided by a low level lookup server 40.

Referring to FIG. 11, a server component 20 issues a Publish request 322 to a low level lookup server 40 that specifies, among other things, first and second metadata MD1, MD2.

The low level lookup server 40 processes the metadata MD2 and updates the associated low level name table (block 324). The low level lookup server 40 may then send a Publish request 326 including the metadata MD1 and including meta-metadata MMD that specifies how the metadata MD1 is to be processed to a high level lookup server 50. The high level lookup server 50 processes the metadata MD1 in accordance with the instructions and/or configuration information provided in the meta-metadata MMD and updates the associated high level name table (block 328).

Figure 12:
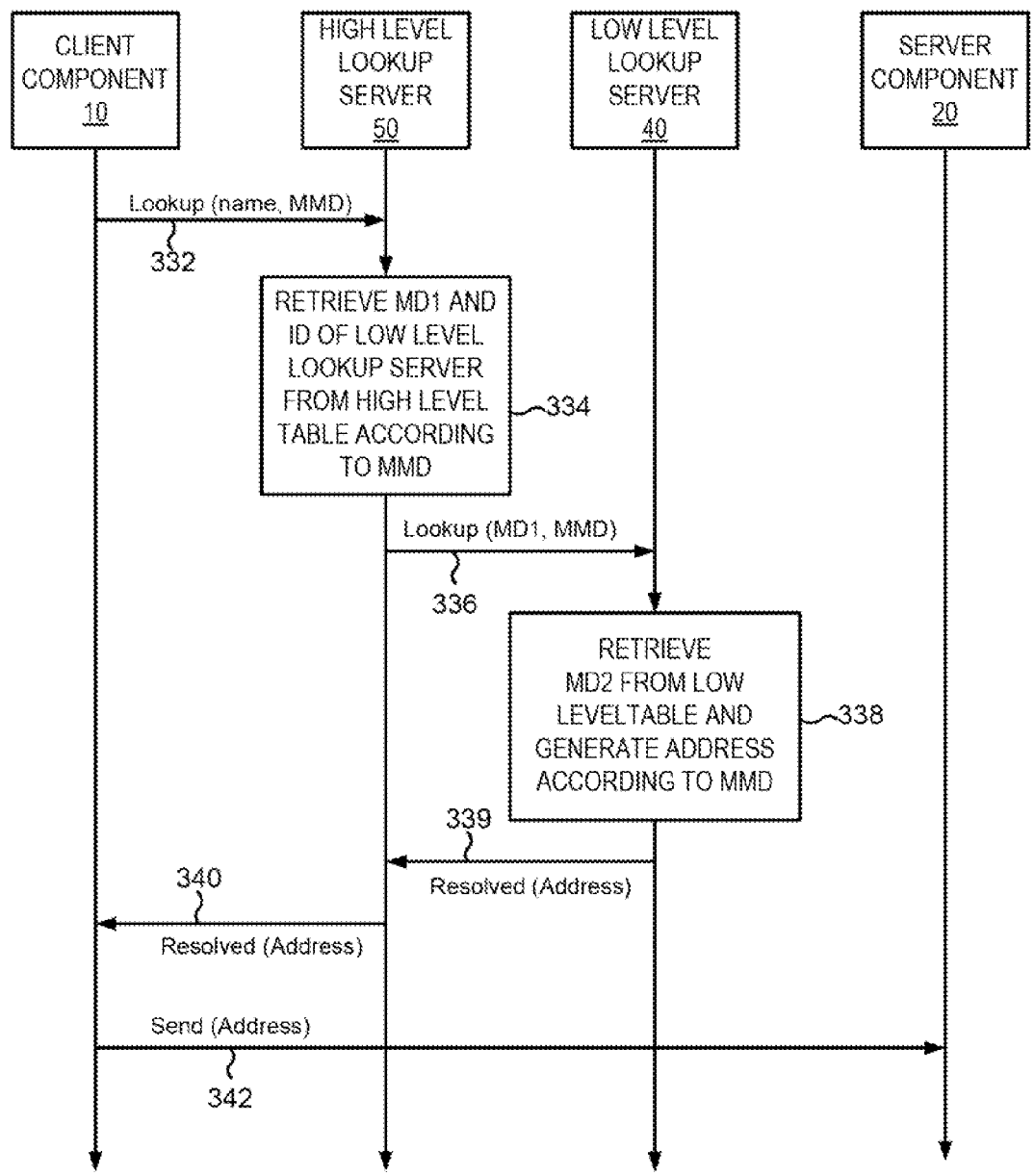
FIG. 12 is a flow diagram illustrating operations that utilize meta-metadata for looking up an address of a server component.

FIG. 12 is a flow diagram illustrating operations for looking up an address of a server component that utilize meta-metadata.

Referring to FIG. 12, a client component 10 issues a Lookup request 332 to a high level lookup server 50. The Lookup request 332 specifies, among other things, a server name and meta-metadata that provides instructions for processing metadata retrieved from name tables in the IPC lookup system.

In response to the Lookup request 332, the high level lookup server 50 retrieves metadata MD1 stored in the high level name table that is associated with the specified server name in accordance with instructions and/or configuration information provided in the meta-metadata (Block 334).

The high level lookup server 50 then issues a Lookup request 336 to a low level lookup server 40. The Lookup request 336 includes the metadata MD1 retrieved by the high level lookup server 50 and also includes the meta-metadata provided by the client component.

In response to the Lookup request 336, the low level lookup server 40 retrieves metadata MD2 stored in the low level name table that is associated with the specified server name in accordance with instructions and/or configuration information provided in the meta-metadata (Block 338). Optionally, the low level lookup server may process the first and second metadata MD1, MD2 in accordance with instructions and/or configuration information contained in the meta-metadata and generate an address of the server component.

The low level lookup server 40 then sends a Resolved message 339 to the high level lookup server 50 that may include the metadata MD1, MD2 or, optionally, the address of the server component. The high level lookup sever 50 may resolve the address of the server component if it has not already been resolved. The high level lookup server 50 may then send a corresponding Resolved message 340 to the client component 10. The client component 10 may then send a message 342 to the server component 20 using the resolved address.

Figure 13:
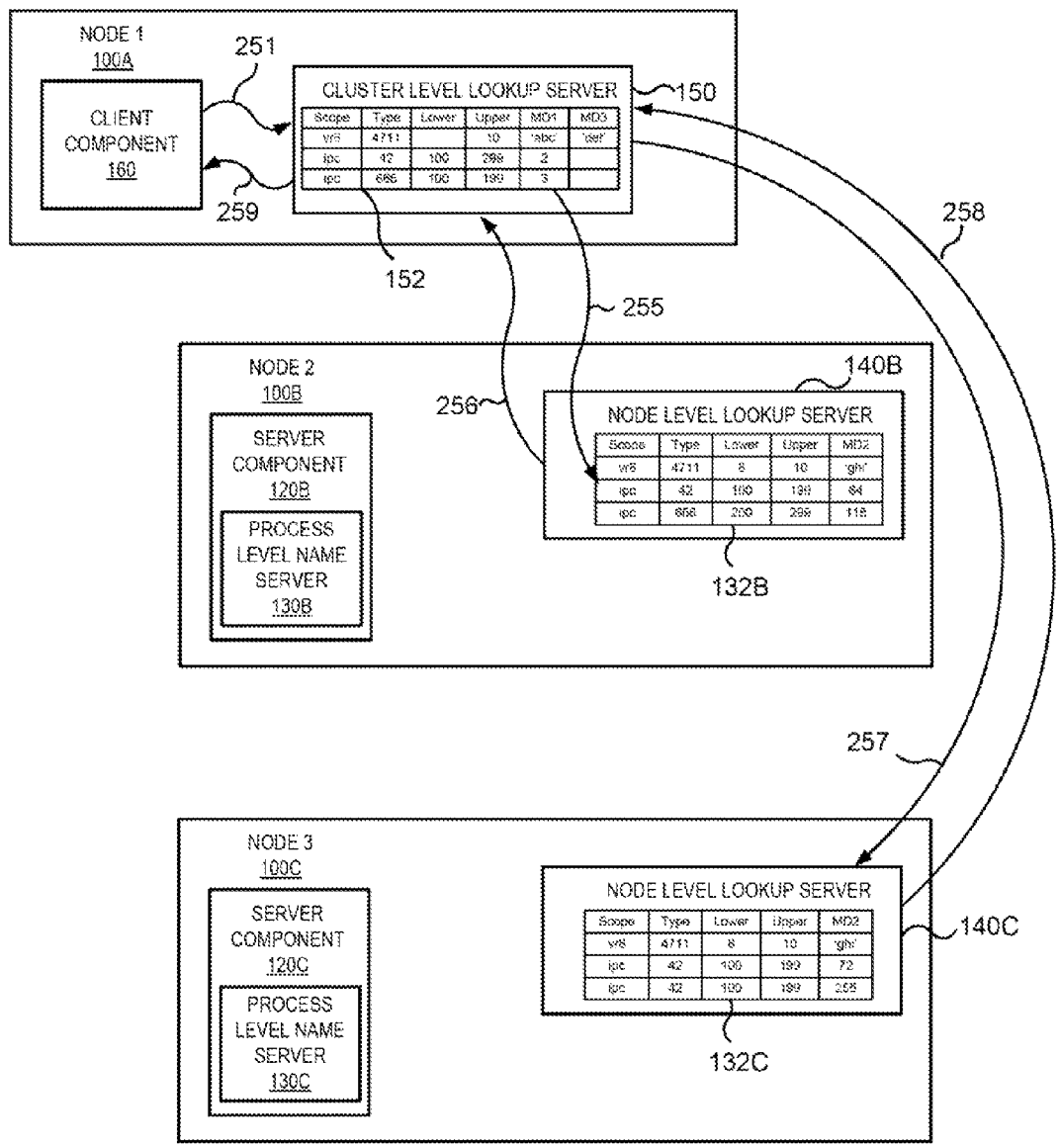
FIG. 13 is a schematic illustration of portions of a system according to further embodiments including a client component and a server component.
Figure 14:
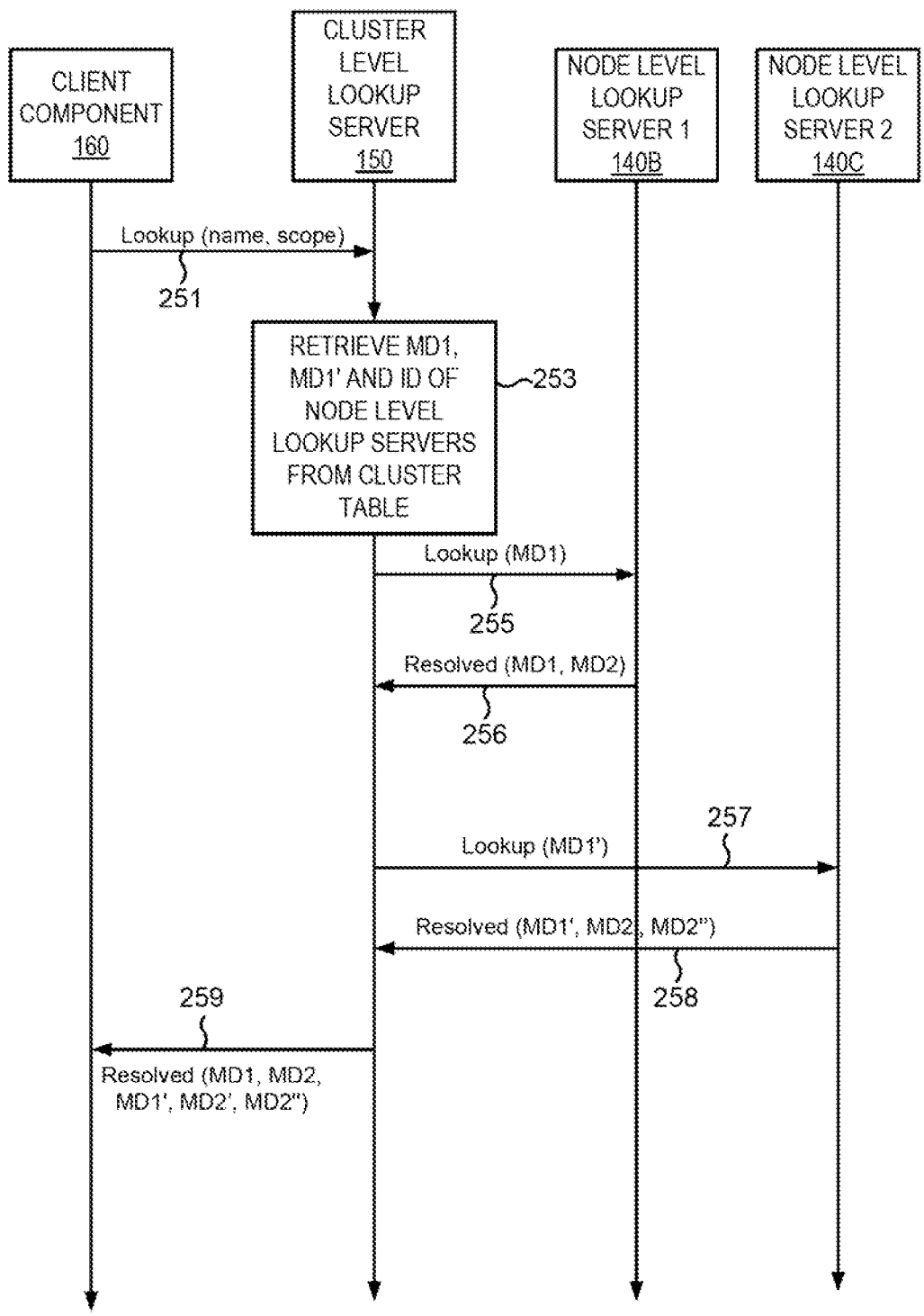
FIG. 14 is a flow diagram illustrating a lookup process in accordance with further embodiments.

An example of a situation in which the cluster level table includes multiple entries corresponding to a particular server type is illustrated in FIGS. 13 and 14.

In the example illustrated in FIGS. 13 and 14, a client component 160 wants to send a message to a server of type 42. The client 160 first calls the nearest instance of the highest level lookup server, which in this example is the cluster level lookup server 150, by issuing a lookup command 251 specifying the name of the desired server component. In this example, the name of the server component includes a two integer value of type=42 and instance=198. The lookup command 251 also specifies the scope of the desired server, which in this example is "IPC." The lookup command 251 may have the form Lookup(scope=ipc, type=42, instance=198).

The cluster level table 152 managed by the cluster level lookup server 150 has two entries corresponding to server type 42 and instance 198. The first entry specifies MD1=2, while the second entry specifies MD1=3.

The cluster level lookup server 150 retrieves the metadata MD1 from the cluster level table that corresponds to servers of the specified scope, type and instance range (block 253). The cluster level lookup server 150 does not have the full information about name type 42. However, it is aware that more information about instance 198 can be found in the node level table on Nodes 2 and 3. Thus, the cluster level lookup server 150 first sends a lookup request 255 along with the first metadata MD1 it has stored {2} to the node level lookup server 140B in Node 2. The Lookup request 255 may have the form Lookup(scope=ipc, type=42, instance=198, md1=2).

In response to the Lookup request 255, the node level lookup server 140B in Node 2 checks the node level table 132B and determines that the range of instances from 100 to 199 is served by a server having metadata {64}. The node level lookup server 140B then returns a Resolved message 256 to the cluster level lookup server 150 containing both the supported range ([100:199]) and the full metadata {2,64}. The Resolved message 256 may have the form Resolved (lower=100, upper=199, md2=64, md1=2).

Next, the cluster level lookup server 150 sends a lookup request 257 along with the second metadata MD1' it has stored {3} to the node level lookup server 140C in Node 3. The Lookup request 257 may have the form Lookup (scope=ipc, type=42, instance=198, md1=3).

In response to the Lookup request 257, the node level lookup server 140C in Node 3 checks the node level table 132C and determines that the range of instances from 100 to 199 is served by servers having metadata {72} and {255}. The node level lookup server 140C then returns a Resolved message 258 to the cluster level lookup server 150 containing both the supported range ([100:199]) and the full metadata {3,[72, 255]}. The Resolved message 256 may have the form Resolved(lower=100, upper=199, md2=[72,255], md1=3).

The cluster level lookup table 150 may then send a Resolved message 259 to the client component 160 including all of the values of MD2 received from the node level lookup servers 140B, 140C. The Resolved message 259 may have the form Resolved(lower=100, upper=199, [{md2=64, md1=2}, {md2=[72,255], md1=3}). The client component 10 may use this information to select and resolve the address of a desired server component.

One potential advantage of systems/methods according to the present invention is flexibility, in the sense that the systems/methods described herein may permit practically any destination format to be used, without letting the lookup server be aware of what type of address (or indeed that it actually is an address) it is storing.

Another potential advantage is that these systems/methods may save memory by only distributing detailed data about a destination as far as strictly necessary.

For the same reason, these systems/methods can save system and/or CPU bandwidth, since publication and update messages may not need to be sent to all nodes.

Address lookup of destination components is similar in nature to domain name lookup services provided by domain lookup servers (DNS). In a DNS system, a client component provides a uniform resource locator, such as an alphanumeric host name (e.g., www.ericsson.com), as a key to a domain lookup server. The domain lookup server resolves the alphanumeric host name into a numeric host IP address (e.g., 192.168.1.100). However, while DNS resolves parts of the key at each level in a hierarchical fashion, systems/methods according to some embodiments may resolve the entire key at each step.

While DNS only stores and returns the full lookup result at the last (lowest) level, systems/methods according to some embodiments may store the result piece by piece in a hierarchical fashion. Those partial results are built up step by step for each level the lookup process goes through, and is only complete when the last level is reached.

Furthermore, systems/methods according to some embodiments provide for the addition of meta-metadata, describing (if necessary) not only the type of data the metadata (e.g. lookup address) consists of, but also how it should be treated at each level in the storage hierarchy.

Some existing solutions, such as domain name lookup services by domain lookup servers (DNS), provide hierarchical lookup services. One disadvantage with the DNS approach is that it has a completely rigid structure. The lookup key is a string, nothing else, and the result is an IP address and a port. There is no concept of integer keys, key suites, metadata that describes the lookup result, or meta-metadata that describes what should happen to the metadata.

Such systems may also suffer from decreased efficiency. Because DNS is based on parsing of strings, it is not suitable for embedded clusters with high requirements on lookup times.

Such systems may further require increased memory consumption. In a large system, the translation table may become huge. This can partly be remedied by managing name ranges, rather than individual ranges, however.

Communication bandwidth requirements of address translations may be large. In a large system, there will be a lot of binding/unbinding activity going on, and the burden of keeping the translation table instances updated at any time may become excessive. Hierarchical address/name lookup and delegation as described herein may solve this problem, apart from further reducing the memory footprint of the translation table.

As will be appreciated by one of skill in the art, the present invention may be embodied as a method, a system, and/or computer program product. Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments of the present invention are described herein with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in an object oriented programming language such as Java or C++. However, the computer program code for carrying out operations of the present invention may also be written in conventional procedural programming languages, such as the "C" programming language. The program code may execute entirely on the user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of looking up an address, comprising:
receiving, at a first hardware lookup server that manages a first database that contains data relating to a first plurality of server components, a first lookup request from a client component, the first lookup request identifying a target server component from among the first plurality of server components;
retrieving first metadata relating to the target server component from the first database; and
sending a second lookup request including the first metadata to a second hardware lookup server that manages a second database that contains data relating to a second plurality of server components including second metadata relating to the target server component, the first and second metadata together comprising information that can be used to resolve an address associated with the target server component, wherein the second plurality of server components is a subset of the first plurality of server components and includes the target server component.

2. The method of claim 1, further comprising:
retrieving the second metadata relating to the target server component from the second database; and
transmitting a response based on the first and second metadata to the client component.

3. The method of claim 2, wherein transmitting the response to the client component comprises transmitting the first and second metadata to the client component.

4. The method of claim 2, further comprising generating an address of the server component in response to the first and second metadata, wherein transmitting the response to the client component comprises transmitting the address of the server component to the client component.

5. The method of claim 1, wherein the first lookup request includes a lookup key that identifies the target server component, the lookup key comprising a type of the target server component.

6. The method of claim 5, wherein the second lookup request includes the lookup key.

7. The method of claim 1, wherein the first metadata identifies a node to which a system that hosts the target server component belongs, and wherein the second metadata identifies a port on the system that is associated with the target server component.

8. The method of claim 1, wherein the first lookup request comprises meta-metadata that instructs the second hardware lookup server how to process the first metadata and the second metadata.

9. The method of claim 8, further comprising generating an address of the server component from the first and second metadata at the second hardware lookup server, wherein transmitting the response to the client component comprises transmitting the address of the server component to the client component.

10. The method of claim 1, further comprising appending meta-metadata to the second lookup request before sending the second lookup request to the second hardware lookup server, wherein the meta-metadata instructs the second hardware lookup server how to process the first metadata and the second metadata.

11. The method of claim 1, further comprising:
retrieving the second metadata relating to the target server component from the second database; and
sending a third lookup request including the first metadata and the second metadata to a third hardware lookup server that manages a third database that contains data relating to a third plurality of server components including third metadata relating to the target server component, the first, second and third metadata together at least partially comprising the information from which an address associated with the target server component can be resolved, wherein the third plurality of server components is a subset of the second plurality of server components and includes the target server component.

12. The method of claim 11, further comprising appending meta-metadata to the lookup request before forwarding the lookup request to the second hardware lookup server, the meta-metadata instructing the second hardware lookup server how to process the first metadata.

13. A method of looking up an address, comprising:
receiving a lookup request from a client component for a target server component of an identified type at a hardware lookup server that manages a first database that identifies nodes that contain address resolution information regarding the identified type of server component;
identifying a node associated with the identified type of server component;
retrieving first metadata from the first database relating to the identified type of server component;
appending the first metadata to the lookup request and forwarding the lookup request to a second hardware lookup server that manages a second database associated with the identified node that stores second metadata, the first and second metadata together comprising information that can be used to resolve an address associated with the target server component.

14. A method of binding an address of a publishing server component to a lookup key in an inter-process communication system, the method comprising:
receiving, at a first hardware lookup server that manages a first database that contains data relating to a first plurality of server components that includes the publishing server component, a first publication request from the publishing server component, the first publication request including first and second metadata relating to an address of the publishing server component;
storing the first metadata in the first database; and
sending a second publication request including the second metadata to a second hardware lookup server that manages a second database that contains data relating to a second plurality of server components, wherein the second plurality of server components is a superset of the first plurality of server components and includes the publishing server component.

15. The method of claim 14, wherein the first metadata comprises a node in which the publishing server component is resident and the second metadata comprises a port associated with the publishing server component.

16. The method of claim 15, wherein the lookup key comprises a suite of process instances associated with the publishing server component.

17. The method of claim 14, wherein the first publication request includes the lookup key.

18. The method of claim 14, wherein the lookup key comprises a type associated with the publishing server component and a process instance associated with the publishing server component.

19. The method of claim 14, wherein the first publication request comprises meta-metadata that instructs the first hardware lookup server and/or the second hardware lookup server on how to manage the first metadata and/or the second metadata.

20. The method of claim 19, wherein the second publication request includes the meta-metadata.

21. The method of claim 14, wherein the first hardware lookup server generates meta-metadata that instructs the second hardware lookup server on how to manage the second metadata, and wherein the second publication request includes the meta-metadata.

22. An interprocess communication system, comprising:
a first hardware lookup server that is configured to manage a first database that contains data relating to a first plurality of server components, configured to receive a first lookup request from a client component, the first lookup request identifying a target server component from among the first plurality of server components, and configured to retrieve first metadata relating to the target server component from the first database; and
a second hardware lookup server that is configured to manage a second database that contains data relating to a second plurality of server components, wherein the second plurality of server components is a subset of the first plurality of server components and includes the target server component;
wherein the first hardware lookup server is configured to send a second lookup request including the first metadata to the second hardware lookup server, and wherein the second hardware lookup server is configured to retrieve second metadata relating to the target server component from the second database, the first and second metadata together comprising information that can be used to resolve an address associated with the target server component, and configured to transmit a response to the client component based on the first and second metadata.

23. An interprocess communication system, comprising:
a first hardware lookup server that is configured to manage a first database that contains data relating to a first plurality of server components that includes a publishing server component, configured to receive a first publication request from the publishing server component, the first publication request including first and second metadata relating to an address of the publishing server component and a lookup key associated with the publishing server component, and configured to store the first metadata in the first database along with the lookup key; and
a second hardware lookup server that is configured to manage a second database that contains data relating to a second plurality of server components, wherein the second plurality of server components is a superset of the first plurality of server components and includes the publishing server component;
wherein the first hardware lookup server is further configured to send a second publication request including the second metadata and the lookup key to a second hardware lookup server, and wherein the second hardware lookup server is configured to store the second metadata in the second database together with the lookup key.

24. A hardware lookup server that is configured to manage a first database that contains data relating to a first plurality of server components, configured to receive a first lookup request from a client component, the first lookup request identifying a target server component from among the first plurality of server components, configured to retrieve first metadata relating to the target server component from the first database, and configured to send a second lookup request including the first metadata to a second hardware lookup server that manages a second database that contains data relating to a second plurality of server components, wherein the second plurality of server components is a subset of the first plurality of server components and includes the target server component, and wherein the second database contains second metadata relating to the target server component, the first and second metadata together comprising information that can be used to resolve an address associated with the target server component.

25. A hardware lookup server that is configured to manage a first database that contains data relating to a first plurality of server components that includes a publishing server component, configured to receive a first publication request from the publishing server component, the first publication request including first and second metadata relating to an address of the publishing server component and a lookup key associated with the publishing server component, configured to store the first metadata in the first database along with the lookup key, and configured to send a second publication request including the second metadata and the lookup key to a second hardware lookup server that manages a second database that contains data relating to a second plurality of server components, wherein the second plurality of server components is a superset of the first plurality of server components and includes the publishing server component.

* * * * *

UNITED STATES PATENT AND TRADEMARK OFFICE
CERTIFICATE OF CORRECTION

| | |
|---|---|
| PATENT NO. | : 8,713,198 B2 |
| APPLICATION NO. | : 13/152995 |
| DATED | : April 29, 2014 |
| INVENTOR(S) | : Maloy et al. |

Page 1 of 1

It is certified that error appears in the above-identified patent and that said Letters Patent is hereby corrected as shown below:

In the Specification

In Column 6, Lines 38-39, delete "network" and insert -- network. --, therefor.

In Column 6, Line 55, delete "and or" and insert -- and/or --, therefor.

In Column 6, Line 66, delete "and or" and insert -- and/or --, therefor.

In Column 9, Line 30, delete "client component 20" and insert -- client component 10 --, therefor.

In Column 9, Line 50, delete "local table I 32B," and insert -- local table 132B, --, therefor.

In Column 11, Line 26, delete "levels" and insert -- levels. --, therefor.

In Column 11, Line 36, delete "1208" and insert -- 120B --, therefor.

In Column 13, Line 41, delete "120E" and insert -- 120B --, therefor.

Signed and Sealed this
Thirtieth Day of September, 2014

Michelle K. Lee
*Deputy Director of the United States Patent and Trademark Office*